United States Patent [19]

Burley et al.

[11] Patent Number: 5,036,900
[45] Date of Patent: Aug. 6, 1991

[54] METHOD FOR ACETYLATING SHREDDED CELLULOSIC

[75] Inventors: Richard Burley, Derby; Lucjan S. Slota, Coventry, both of United Kingdom

[73] Assignee: Courtaulds PLC, Great Britain

[21] Appl. No.: 600,164

[22] Filed: Oct. 17, 1990

Related U.S. Application Data

[63] Continuation of Ser. No. 379,004, Jul. 12, 1989, abandoned.

[30] Foreign Application Priority Data

Jul. 15, 1988 [GB] United Kingdom ............... 8816864

[51] Int. Cl.⁵ .......................... C08B 3/06; D21C 1/12
[52] U.S. Cl. ........................................ 162/9; 162/23; 162/157.6; 162/207; 536/69; 536/70
[58] Field of Search ...................... 536/69, 70; 162/23, 162/90, 157.6, 207, 9; 241/1, 28

[56] References Cited

U.S. PATENT DOCUMENTS

| | | |
|---|---|---|
| 1,851,008 | 5/1932 | Hanson et al. |
| 2,008,021 | 7/1935 | Kenety |
| 2,054,301 | 9/1936 | Richter .................... 92/1 |
| 2,105,498 | 1/1938 | Parrett et al. |
| 2,393,783 | 1/1946 | Kridel ...................... 241/1 |
| 2,415,949 | 2/1947 | Holloway et al. |
| 2,478,396 | 8/1949 | Hincke et al. ............ 260/225 |
| 2,603,637 | 7/1952 | Blackman et al. ........ 260/229 |
| 3,808,090 | 4/1974 | Logan et al. ............. 162/23 |
| 4,601,759 | 7/1986 | Furubayashi et al. ..... 106/436 |

FOREIGN PATENT DOCUMENTS 914674 11/1972 Canada.
343712 2/1931 United Kingdom.
888845 2/1962 United Kingdom.

OTHER PUBLICATIONS

Rydholm, *Pulping Processes*, Interscience Publishers, New York, Sep. 1967, pp. 1166–1173.
Nelson et al., "Activation of Cellulose for Acetylation by Mechanical Refining in Acetic Acid", Tappi Dissolving Pulp Conference, 1973, pp. 69–82.
Tedesco et al., "Effect of Pulp Alpha Content on Acetate End-Use Properties—Possible Techniques to Allow Greater Utilization of Lower Alpha Pulps for Acetate Production", Tappi Dissolving Pulp Conference, 1977, pp. 84–87.

Primary Examiner—Steve Alvo
Attorney, Agent, or Firm—Howson and Howson

[57] ABSTRACT

Cellulosic sheet material is processed in preparation for esterification for example acetylation to produce cellulose acetate, by treating the sheet material with water and then feeding the wetted material into a machine that simultaneously shreds and dries the material. The conditions in the machine are carefully controlled (outlet temperature not in excess of 110° C. and moisture content 4–15% by weight) to ensure that the cellulosic material does not become deactivated towards esterification. The method enables low alpha content cellulosic material supplied in the form of high density sheet to be acetylated to produce high quality cellulose acetate flake.

12 Claims, 1 Drawing Sheet

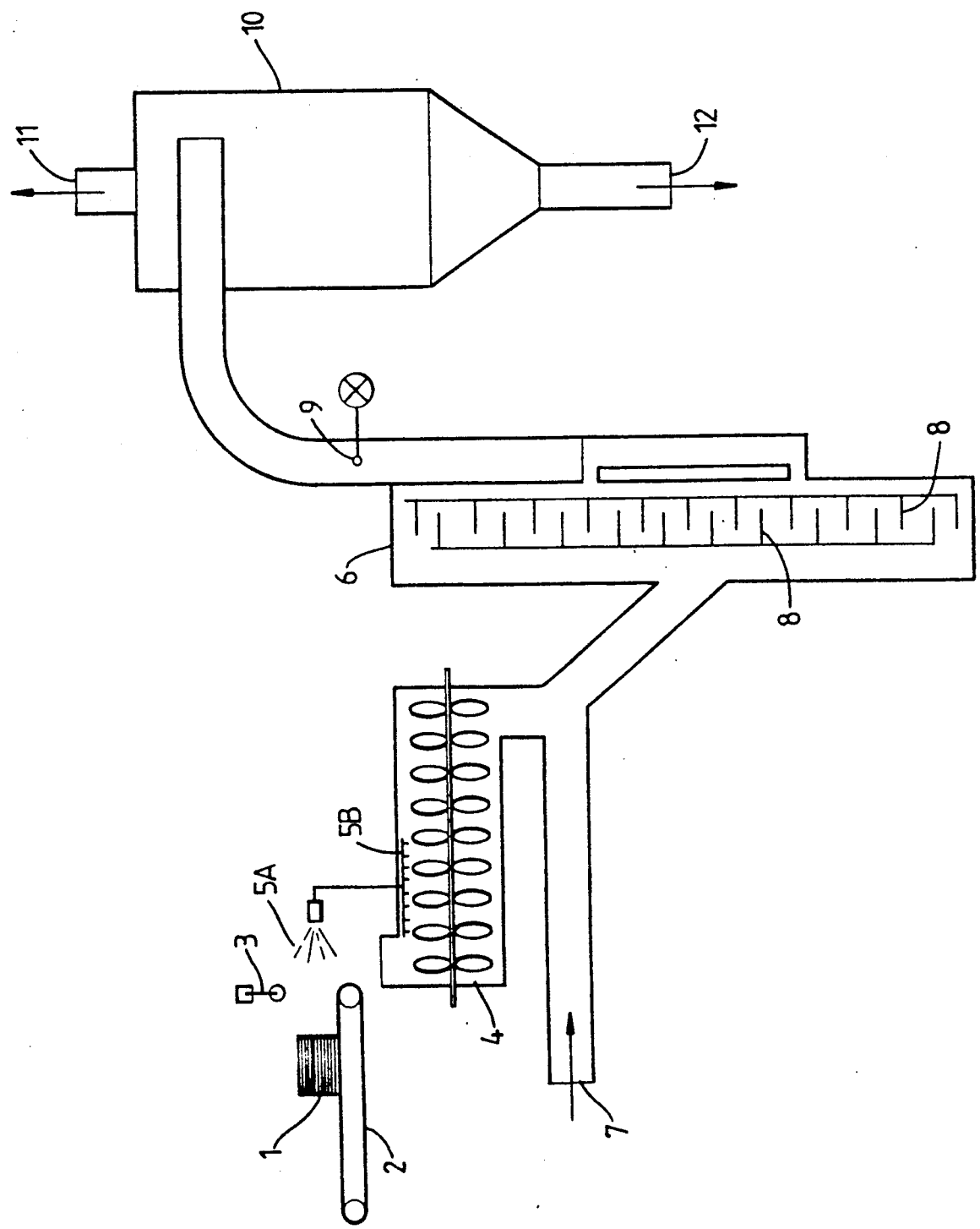

METHOD FOR ACETYLATING SHREDDED CELLULOSIC

This is a continuation of co-pending application Ser. No. 07/379,004 filed on July 12, 1989 and now abandoned.

The present invention is concerned with the treatment of cellulosic sheet material. More particularly, it relates to the preparation of cellulosic sheet material prior to esterification of the cellulose, for example acetylation of cellulose to form cellulose acetate.

It is common practice to esterify cellulosic material for conversion to cellulose acetate. One preferred source of cellulosic material is wood pulp with a high alpha cellulose content of typically between 95 and 98% alpha cellulose by weight, based on the total weight of the wood pulp. The higher the proportion of alpha cellulose, the higher the yield of esterified cellulose. High alpha content wood pulp is usually supplied as soft sheet material having a relatively low density of typically 0.4 to 0.5 g cm$^{-3}$. These sheets can be shredded into a form suitable for esterification, for example using a conventional hammer mill, with little if any deactivation of the cellulose towards esterification.

High alpha content wood pulp is expensive and supply is becoming relatively scarce. There is therefore a need to find alternative sources of cellulose. One source is low alpha content wood pulp, by which is meant wood pulp having an alpha cellulose content of about 90 up to 95% by weight, based on the total weight of the wood pulp. However, this type of pulp is usually produced as high density sheet, typically having a density of about 0.6 to 0.85 g cm$^{-3}$. This high density sheet requires considerable shredding before it is in a form suitable for esterification, and the shredding causes deactivation of the cellulose, resulting in poor quality cellulose ester with a relatively high content of unreacted cellulose. It is therefore necessary to find a way of processing high density sheets of low alpha content wood pulp for esterification without deactivating the cellulose.

It is known from U.S. Pat. No. 2,393,783 to activate cellulose prior to nitration by wetting wood pulp sheet and then subjecting it to a violent blast of compressed air to separate the fibres from one another. The fibres are then blown into a collecting bin using an air stream that also dries the fibres. Such a process is relatively expensive and dangerous to operate and does not break up the pulp sheet very well.

It is also known from UK patent No. 714,163 to heat loose fibres of cellulosic material, for example wood pulp which has been decontaminated, with 15-30% water and then to reduce the water content to 5-7% by blowing air through the material for 50-150 seconds at 25°-65° C. to form a uniformly activated cellulose which can then be acetylated. However, it will be appreciated that the starting material for the process of that patent is in the form of loose fibres and not sheet material.

Neither of the above methods is suitable for the processing of high density sheets of low alpha content pulp for use in a commercially viable esterification process.

According to the present invention there is provided a method of processing cellulosic sheet material in preparation for esterification, characterised by treating the cellulosic sheet material with water, feeding the wetted material into a machine that dries and shreds the material substantially simultaneously, the drying being carried out by a hot drying gas supplied to the machine, and passing shredded material out of the machine, the operating conditions being controlled so that the temperature of the drying gas at the outlet of the machine does not exceed 110° C. and the moisture content of the shredded material passing out of the machine is from 4 to 15% by weight, based on the dry weigth of the cellulosic material.

Although the method according to the invention can be applied to any type of cellulose in sheet form, it is advantageously applied to high density sheet, typically having a density of from 0.6 to 0.8 g cm$^{-3}$. The method has the benefit that it prevents deactivation of the cellulose and thus enables high quality cellulose ester to be produced. The method is especially suitable for low alpha content wood pulp, which is generally produced in high density sheet form.

The amount of water with which the pulp sheet is initially treated depends to some extent on the density of the sheet, a higher density requiring a greater quantity of water. In general, the amount of water is preferably in the region of 40 to 80%, more preferably 50 to 70%, by weight based on the dry weight of the pulp.

Preferably, the wetted sheets are passed initially to a device which breaks them up into fairly small pieces before these pieces are fed to a high temperature sheredding and drying machine.

The drying and shredding of the wetted material is preferably carried out in a pin mill equipped with drying means, especially a particular design of pin mill known as an Atritor. An Atritor has the advantage that it can operate at high inlet temperatures of up to about 550° C., and therefore enables material passing through the Atritor to be dried very rapidly, giving low throughput times, typically of less than 5 seconds. Surprisingly, it has been found that the high temperatures of the Atritor can be utilised to dry high density sheets of wetted cellulosic material, whilst the material is simultaneously being shredded, without deactivating the cellulose provided that the conditions are carefully controlled so that at the outlet of the Atritor the temperature of the drying gas does not exceed 110° C. and the moisture content of the dried cellulosic material is from 4 to 15%.

It is believed that the Atritor also has an advantage over other methods of shredding wood pulp in that, on entering the Atritor, the water contained in the wetted material is immediately converted to vapour because of the high temperatures. This aids separation of the fibres in the pulp, giving to the resulting shredded pulp an open structure which assists the subsequent esterification of the cellulose.

The moisture content of the shredded material passing out of the machine is preferably from 5 to 10%, most preferably 6 to 8%, by weight, based on the dry weight of the cellulosic material. If the cellulose is dried to a moisture content below 4% by weight then the celluose starts to become deactivated and this ultimately results in a poor quality cellulose ester. On the other hand, if the moisture content of the dried material rises above 15% by weight, the cellulose becomes difficult to process and additional amounts of esterification reagent are needed to convert the cellulose to the ester.

The temperature of the drying gas at the outlet of the pin mill or the like is preferably controlled to be within the range of 80° to 110° C., more preferably 85° to 95° C., e.g. not in excess of 90° C. As the shredded cellulosic material is as a rule carried out of the machine in the stream of drying gas the outlet temperature of the shredded material more or less matches the outlet temperature of the gas. It is not so essential to control the temperature of the gas at the inlet to the pin mill or the like to within such a narrow range, and preferably this is from 300° to 550° C., more preferably 350° to 450° C. It is usual for the outlet temperature to be selected first and then the inlet temperature monitored and adjusted accordingly to give the required outlet temperature. This monitoring and adjusting can conveniently be carried out automatically using conventional control equipment.

For safety reasons, the pin mill or the like is preferably operated with a drying gas containing a reduced level of oxygen as compared with air, for example about 8% oxygen by volume.

The invention will now be illustrated by the following Examples and with reference to the accompanying drawing.

BRIEF DESCRIPTION OF THE DRAWING

The FIGURE shows suitable apparatus for carrying out the method of the invention.

The quality of the cellulose acetate, otherwise known as flake, produced in the Examples is measured by its plugging value (PV). Plugging value is defined as the amount of dry cellulose acetate, in the form of a dope consisting of 7.5% by weight cellulose acetate dissolved in a solvent consisting of 95% by weight acetone and 5% by weight water, that will filter through a given area of a specified filter pad before the filter pad becomes blocked by insoluble, non-acetylated pulp fibres present in the material. The filter pad is 1cm$^2$ and consists of 30 layers of KIMPAK filter papers sandwiched between swansdown. On the topside the swansdown consists of two swansdown layers with the fluffed sides facing. On the underside it consists of three swansdown layers with the two layers nearest the filter papers having their fluffed sides facing, and the bottom layer having its fluffed side facing away from the filter papers.

The higher the plugging value, the better the quality fo the flake. In general a PV of 30 g cm$^{-2}$ or more indicates an acceptable quality flake. The present invention enables cellulose acetate flake of reasonable or high quality to be made from wood pulp sheet having a density of at least 0.6 g cm$^{-3}$, e.g. comprising low alpha content cellulosic material.

EXAMPLE 1

Six batches of 1400 kg wood pulp having an alpha content of 92% (available from Saiccor (Proprietary) Ltd) in sheet from were processed for subsequent acetylation. The sheet had a density of 0.83 g cm$^{-3}$. The pulp sheet was wetted with 65 parts water/100 parts pulp one day before it was fed at a rate of about 300 kg/hour pulp into a paddle conveyor which broke it down into small pieces and dropped them into a stream of hot gas entering an Atritor pin mill. The finely shredded pulp, dried to an average moisture content of 7.5%, left the machine in a gas stream at 80°-90° C. and was discharged by a cyclone. The resulting shredded pulp was acetylated in a conventional manner without problem and gave cellulose acetate flake of an average plugging value of 32 g cm$^{-2}$. This could be spun into acetate yarns in a conventional manner without problems.

EXAMPLE 2

Further batches of the Saiccor wood pulp of Example 1 were prepared for acetylation using the apparatus as shown in the accompanying drawing.

Bales of the wood pulp sheets 1 were fed on a conveyor 2 to a sheet picker 3, which picked off the sheet individually and fed them to a paddle mixer shredder 4 at a rate of about 1400 kg per hour. As the sheets fell into the mixer 4, water was sprayed 5A and 5B onto them. (Note that if the wood pulp is supplied in the form of a roll rather than baled sheets, then this roll can be fed continuously into the mixer shredder 4.) The mixture shredder 4 broke up the individual sheets into a coarse shred of approximately 1 to 10 cm diameter having a moisture content of about 65% by weight based on the dry weight of the pulp.

The wet coarse shred was passed from the mixer shredder 4 into an Atritor pin mill 6 supplied by Atritor Ltd. Hot gas, heated to about 400° C., entered the Atritor 6 via an inlet 7 and dried the wet, coarse shred whilst it was simultaneously being pulverised to a fine shred by the mechanical action of the pins 8 in the Atritor 6. The rate of flow of the hot gas was approximately 9300 m$^3$ per hour. The residence time of the pulp in the Atritor 6 depended to some extent upon the size of the coarse shred entering the Atritor, but it was generally in the range of 0.25 to 4 seconds. The gas flow carried the shredded pulp through the Atritor 6, and at the Atritor outlet 9 the temperature of the gas was continuously monitored and controlled to be about 90° C., the average moisture content of the finely shredded, dried pulp at the outlet 9 being about 7.5% by weight based on the dry weight of the pulp.

The gas carried the pulp from the Atritor 6 to a cyclone 10 where the gas was separated from the shredded pulp. The gas exited the cyclone at the outlet 11 and, after being scrubbed to remove water vapour and pulp fines, was recycled back to the Atritor. The shredded pulp exited the cyclone 10 at outlet 12 and was conveyed to acetylation apparatus for conversion to cellulose acetate flake using standard acetylation proesses.

The resulting flake had a plugging value of 44 g cm$^{-2}$.

EXAMPLE 3

Example 2 was repeated a number of time using the Saiccor 0.83 g cm$^{-3}$ density sheet wood pulp with an alpha content of 92% with variations to the temperature of the gas at the Atritor outlet 9 and the final moisture content of the shredded pulp. The results are given in Table 1 below in which T is the temperature of the gas at the Atritor outlet, MC is the moisture content of the shredded pulp after passing through the Atritor and PV is the plugging value of cellulose acetate flake prepared from the pulp using standard acetylation techniques.

TABLE 1

| T° C. | MC wt % | PV g cm$^{-2}$ |
|---|---|---|
| 85 | 9.4 | 31 |
| 85 | 10.1 | 47 |
| 90 | 10.2 | 44 |
| 90 | 8.5 | 53 |
| 95 | about 10 | 42 |
| 95 | about 10 | 46 |
| 110 | 11.7 | 37 |

EXAMPLE 3A

Flake was obtained from the same Saiccor pulp which had not undergone the pretreatment according to the invention. Instead, the pulp sheets were fed directly into a conventional hammer mill to produce a fine shred. No water was added to the pulp to or during the shredding. The shredded pulp was acetylated using standard techniques and had a plugging value of 14 g cm$^{-2}$.

EXAMPLE 4

Example 2 was repeated except that different types of wood pulp sheet were substituted for the Saiccor, the pulps having differing alpha contents and sheet densities. The results are given in Table 2.

TABLE 2

| Pulp Type | Supplier | Alpha content % | Sheet density g cm$^{-3}$ | PV g cm$^{-2}$ |
|---|---|---|---|---|
| SVS Extra | Borregard | 91 | 0.73 | 38 |
| Aliceta | Western Pulp | 95 | 0.44 | 41 |
| Acetanier | ITT Rayonier | 95 | 0.44 | 32 |
| Rayaceta | ITT Rayonier | 97 | 0.52 | 36 |

What is claimed is:

1. A method for acetylating shredded cellulosic material comprising the steps of treating cellulosic sheet material having a density in excess of 0.6 g/cm$^3$ and an alpha content of less than 95% with water, feeding the wetted material into a machine that dries and shreds the material substantially simultaneously, the drying being carried out by a hot drying gas supplied to said machine, the temperature of the hot drying gas being such that water in the wetted material is immediately converted to vapor, and passing shredded material out of said machine, the operating conditions being controlled so that the temperature of the drying gas at the outlet of said machine does not exceed 110° C. and the moisture content of the shredded material passing out of said machine is from 4 to 15% by weight based on the dry weight of the material, and acetylating the shredded cellulosic material.

2. A method according to claim 1 wherein the temperature of the drying gas at the outlet of said machine is from 80° to 110° C.

3. A method according to claim 1 wherein the temperature of the drying gas does not exceed 90° C. at the outlet of said machine.

4. A method acoording to claim 1 wherein the moisture content of the material passing out of said machine is from 5 to 10, by weight based on the dry weight of the material.

5. A method according to claim 1 wherein the cellulosic material is treated with water so that it has a water content of 40 to 80% by weight, based on the dry weight of the material, before being fed into said machine.

6. A method according to claim 1 wherein said machine is a pin mill equipped with drying means.

7. A method according to claim 1 wherein the residence time of the cellulosic material in said machine is less than 5 seconds.

8. A method as claimed as claim 1 in which the hot drying gas is supplied to the machine at a temperature in the range of about 300° C. to about 550° C.

9. A method as claimed in claim 8 in which the hot drying gas is supplied to the machine at a temperature in the range of about 350° C. to about 450° C.

10. A method as claimed in claim 1 in which the hot drying gas supplied to the machine contains a level of oxygen less than that of air.

11. A method as climed in claim 10 in which the hot drying gas contains about 8% oxygen by volume.

12. A method for acetylating shredded cellulosic sheet material comprising the steps taken in sequence of
 (i) treating cellulosic sheet material having a density in excess of about 0.6 g/cm$^3$ and an alpha content of less than 95% with water so that it has a water content in the range of about 40% to about 80% by weight, based on the dry weight of said cellulosic material,
 (ii) feeding the thusly treated and wetted material into a machine that dries and simultaneously shreds the material,
 (iii) blowing a hot drying gas into said machine to effect the drying, said hot drying gas:
  (a) being supplied to said machine at a temperature in the range of about 300° C. to about 550° C., and
  (b) having a reduced level of oxygen compared to air,
 (iv) passing the thusly shredded and dried material out of the said machine,
 (v) controlling the operating conditions of the said machine so that:
  (a) the temperature of the drying gas at the outlet of the said machine is maintained in the range of about 80° C. to about 110° C., and
  (b) the moisture content of said shredded material passing out of the machine is maintained in the range of about 4% to about 15% by weight based on the dry weight of cellulosic material; and
 (vi) acetylating said shredded mateiral.

* * * * *

UNITED STATES PATENT AND TRADEMARK OFFICE
CERTIFICATE OF CORRECTION

PATENT NO. : 5,036,900

DATED : August 6, 1991

INVENTOR(S) : Richard Burley and Lucjan S. Slota

It is certified that error appears in the above-identified patent and that said Letters Patent is hereby corrected as shown below:

Col. 2, line 13, delete "0.8" and insert -- 0.85 --.

Col. 2, line 27, delete "shered-ding" and insert -- shredding --.

Col. 2, line 59, delete "celluose" and insert -- cellulose --.

Col. 3, line 44, delete "fo" and insert -- of --.

Col. 3, line 55, delete "from" and insert -- form --.

Col. 4, line 43, delete "proesses" and insert -- processes --.

Col. 4, line 49, delete "time" and insert -- times --.

Col. 5, line 7, delete "to the pulp to" and insert -- to the pulp prior to --.

Signed and Sealed this

Second Day of February, 1993

Attest:

STEPHEN G. KUNIN

Attesting Officer

Acting Commissioner of Patents and Trademarks